(12) United States Patent
Yamamoto et al.

(10) Patent No.: US 11,005,242 B2
(45) Date of Patent: May 11, 2021

(54) WIRING MEMBER AND COMPOSITE HARNESS

(71) Applicant: Sumitomo Wiring Systems, Ltd., Mie (JP)

(72) Inventors: Hironobu Yamamoto, Mie (JP); Moriyuki Shimizu, Mie (JP); Toshinari Kobayashi, Mie (JP); Kyungwoo Kim, Mie (JP); Yukitoshi Terasaka, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/818,393

(22) Filed: Mar. 13, 2020

(65) Prior Publication Data

US 2020/0295546 A1    Sep. 17, 2020

(30) Foreign Application Priority Data

Mar. 13, 2019 (JP) .............................. JP2019-046058
Nov. 18, 2019 (JP) .............................. JP2019-207776

(51) Int. Cl.
*H02G 3/04* (2006.01)
*H01B 7/18* (2006.01)
*H01B 7/00* (2006.01)
*B60R 16/02* (2006.01)

(52) U.S. Cl.
CPC ....... *H02G 3/0406* (2013.01); *B60R 16/0215* (2013.01); *H01B 7/0045* (2013.01); *H01B 7/18* (2013.01)

(58) Field of Classification Search
CPC .. B60R 16/0207; B60R 16/0215; H02G 3/04; H02G 3/0406; H01B 7/17; H01B 7/18; H01B 7/0045
See application file for complete search history.

(56) References Cited

U.S. PATENT DOCUMENTS

| | | | |
|---|---|---|---|
| 2014/0151115 A1* | 6/2014 | Ichikawa | B60R 16/0207 174/70 R |
| 2014/0224945 A1* | 8/2014 | Okuhara | H02G 3/30 248/74.1 |
| 2017/0154706 A1 | 6/2017 | Yamamoto et al. | |
| 2017/0331263 A1* | 11/2017 | Matsumura | H01B 7/0045 |
| 2019/0351845 A1* | 11/2019 | Toyoshima | H01R 13/5205 |
| 2020/0203938 A1* | 6/2020 | Yanazawa | H02G 3/0475 |

FOREIGN PATENT DOCUMENTS

JP    S63-166507 A    7/1988

* cited by examiner

*Primary Examiner* — Timothy J Thompson
*Assistant Examiner* — Amol H Patel
(74) *Attorney, Agent, or Firm* — Honigman LLP

(57) ABSTRACT

A wiring member includes wires and a resin molded portion. The wires include a curved portion to be arranged along a curved path. The resin molded portion includes a main body portion and a curve reinforcing portion. The main body portion covers the curved portion of the wires. The curve reinforcing portion protrudes from an outer peripheral surface of the main body portion and extends along an extending direction of the curved portion so as to keep the wiring member in a curved state.

14 Claims, 7 Drawing Sheets

WIRING MEMBER AND COMPOSITE HARNESS

CROSS-REFERENCE TO RELATED APPLICATIONS

This application claims priority of Japanese Patent Application No. JP 2019-046058 filed on Mar. 13, 2019 and Japanese Patent Application No. JP 2019-207776 filed on Nov. 18, 2019, the contents of which are incorporated herein.

TECHNICAL FIELD

The present disclosure relates to a wiring member and a composite harness.

BACKGROUND

JP 2017-98143A discloses a conductive path that includes one main path, two branch paths that branch from a leading end portion of the main path, outer covering members, waterproofing members, and a resin molded body. The main path is constituted by a plurality of wires that are collectively embedded in a sheath. Leading end side portions of the plurality of wires are exposed from a leading end surface of the sheath to the outside and constitute the two branch paths. The outer covering members each have a substantially cylindrical shape and respectively surround leading end side regions of the branch paths. The waterproofing members seal gaps between openings of base end portions of the outer covering members and the wires. The resin molded body is molded as a single member together with a leading end portion of the main path, base end portions of the two branch paths, the two waterproofing members, and the base end portions of the two outer covering members. At a branched portion, one of the branch paths extends straight relative to the main path and the other branch path extends while curving relative to the main path.

According to JP 2017-98143A, the state in which the other branch path curves relative to the main path is maintained by the resin molded body.

However, ordinarily, wires extending from the main path toward the other branch path initially have a straight shape or an approximately straight shape. Therefore, a force that acts to restore the initial shape of the wires, e.g., an approximately straight state, may be generated in the wires. In such a case, it is difficult for the resin molded body to maintain the state in which the other branch path curves relative to the main path.

Therefore, it is an object of the present disclosure to more reliably keep a wiring member in a curved state.

SUMMARY

A wiring member according to the present disclosure includes a wire that includes a curved portion to be arranged along a curved path and a resin molded portion that includes a main body portion that covers the curved portion of the wire and a curve reinforcing portion that protrudes from an outer peripheral surface of the main body portion and extends along an extending direction of the curved portion.

According to the present disclosure, the main body portion and the curved portion covered by the main body portion are more reliably kept in a curved state by the curve reinforcing portion.

DETAILED DESCRIPTION OF EMBODIMENTS

Figure 1:
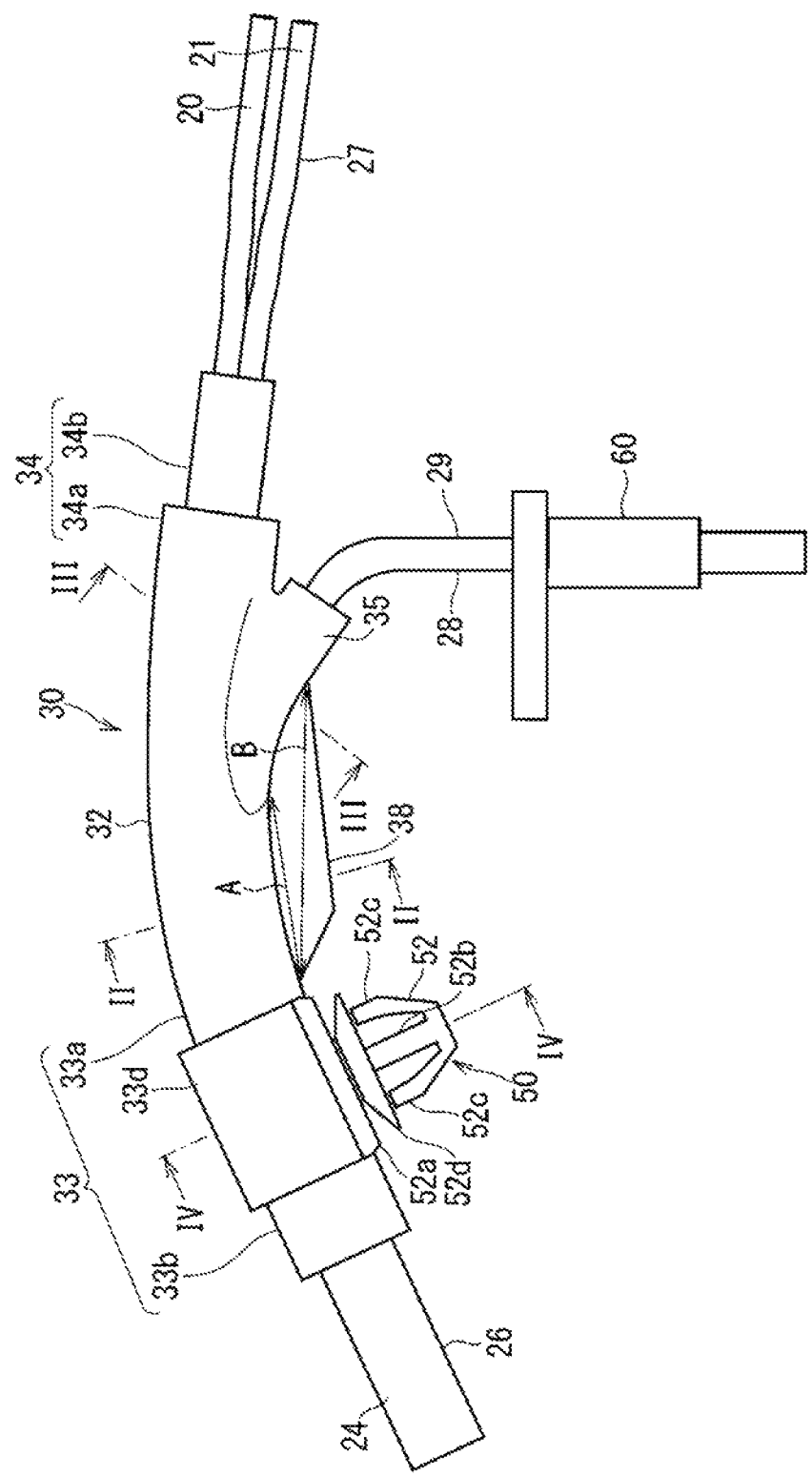
FIG. 1 is a side view showing a wiring member according to Embodiment 1.

First, embodiments of the present disclosure will be listed and described.

A wiring member according to the present disclosure is configured as described below.

A wiring member includes a wire that includes a curved portion to be arranged along a curved path and a resin molded portion that includes a main body portion that covers the curved portion of the wire and a curve reinforcing portion that protrudes from an outer peripheral surface of the main body portion and extends along an extending direction of the curved portion. With this configuration, the main body portion and the curved portion covered by the main body portion are more reliably kept in a curved state by the curve reinforcing portion.

The curve reinforcing portion may be provided on an inner circumferential side of a curved shape of the main body portion. A force that acts to restore the curved portion to a straight state also acts to restore the main body portion to a straight state. If the curve reinforcing portion is provided on the inner circumferential side of the curved shape of the main body portion, this force acts as a tensile force on the curve reinforcing portion. It is thought that the curve reinforcing portion is less likely to deform in a case in which the curve reinforcing portion is pulled on than in a case in which the curve reinforcing portion is compressed, and therefore the main body portion and the curved portion are more reliably kept in the curved state.

A configuration is also possible in which the wiring member includes a plurality of the wires and a sheath that covers the plurality of wires, the plurality of wires extend from an end portion of the sheath and branch therefrom into a plurality of branches, and the resin molded portion covers the end portion of the sheath and base end portions of the plurality of wires branching from the end portion of the sheath. The portion at which the wires branch is made waterproof by the resin molded portion. Furthermore, the wires are kept in the curved state in the vicinity of the portion.

The resin molded portion may be provided with a fixing member configured to be fixed to a fixing target. With this configuration, the wire is kept in the curved state from a portion fixed to the fixing target.

A configuration is also possible in which the main body portion includes a curve covering portion that extends in a curved state and covers the curved portion, and the curve covering portion is provided with the fixing member. In this case, the curved portion of the wire can be fixed to the fixing target using the fixing member. This improves freedom of the layout of the wiring member.

A configuration is also possible in which the fixing member includes a first fixing portion configured to be fixed to a fixing target and a second fixing portion configured to be fixed to the resin molded portion, and the second fixing portion is embedded in the resin molded portion. With this configuration, the fixing member is firmly fixed to the resin molded portion.

A configuration is also possible in which the second fixing portion includes: a second fixing portion main body that is embedded in the resin molded portion so as to extend in a direction intersecting an extending direction of the wire and includes one end portion that is continuous to the first fixing portion that extends outward from the resin molded portion; and a stopper portion that protrudes from another end portion of the second fixing portion main body in a direction intersecting an extending direction of the second fixing portion main body and the extending direction of the wire and faces the wire inside the resin molded portion, and resin is interposed in at least a portion between the stopper portion and the wire. In this case, the stopper portion keeps the fixing portion from coming out from the resin molded portion. As a result of the resin being interposed in at least a portion between the stopper portion and the wire, the wire is not restricted by the shape of the stopper portion and is kept in the curved state having a desired shape.

The second fixing portion may include a plurality of restriction surfaces that restrict a position of the wire from a plurality of directions in a state before the resin molded portion is formed. With this configuration, the position of the wire is restricted by the plurality of restriction surfaces from the plurality of directions in the state before the resin molded portion is formed, and therefore the wire is unlikely to be exposed from the resin molded portion to the outside.

The wiring member may be a composite harness that includes a plurality of types of wires as a plurality of the wires. In the composite harness including the plurality of types of wires, the main body portion and the curved portion covered by the main body portion are more reliably kept in the curved state by the curve reinforcing portion.

The following describes specific examples of a wiring member and a composite harness according to the present disclosure with reference to the drawings. Note that the present disclosure is not limited to these examples, but is defined by the claims, and is intended to encompass all modifications within the meanings and scope that are equivalent to the claims.

Embodiment 1

Figure 2:
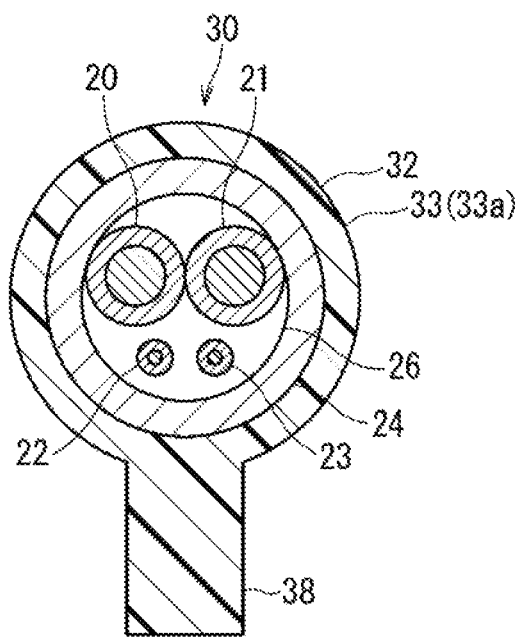
FIG. 2 is a cross-sectional view taken along line II-II in FIG. 1.
Figure 3:
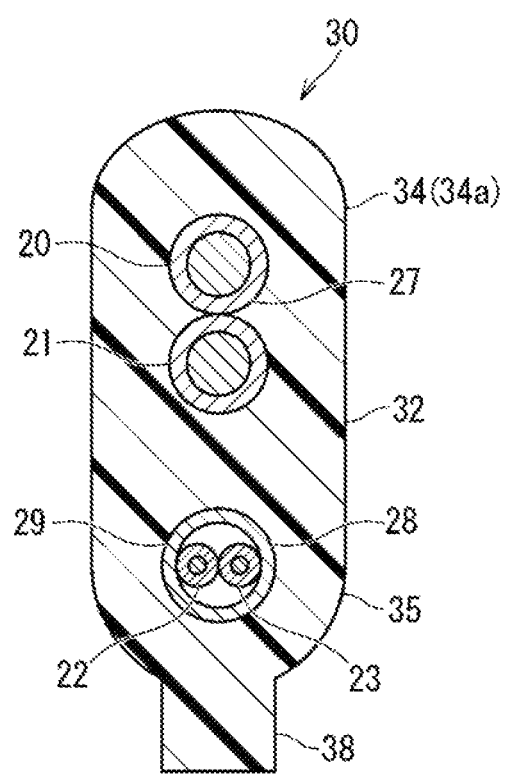
FIG. 3 is a cross-sectional view taken along line in FIG. 1.
Figure 4:
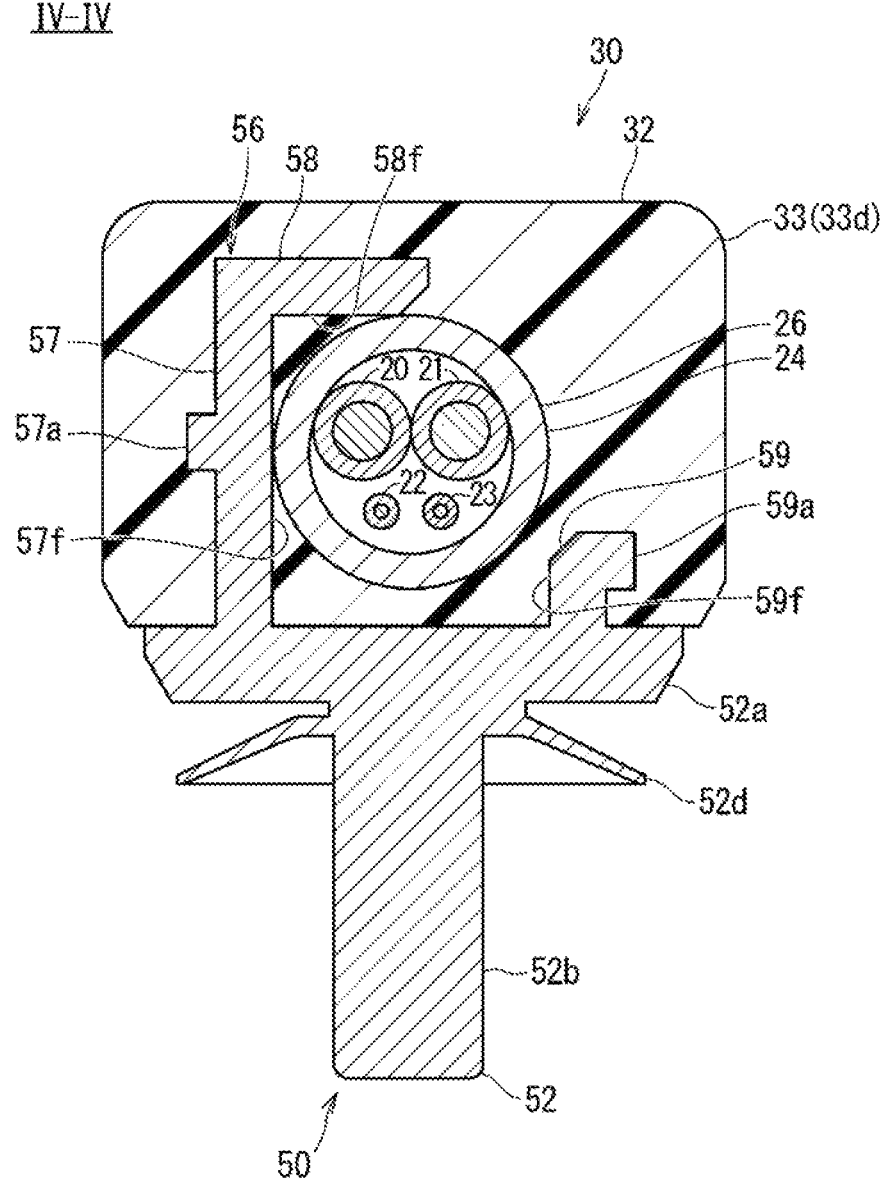
FIG. 4 is a cross-sectional view taken along line IV-IV in FIG. 1.
Figure 5:
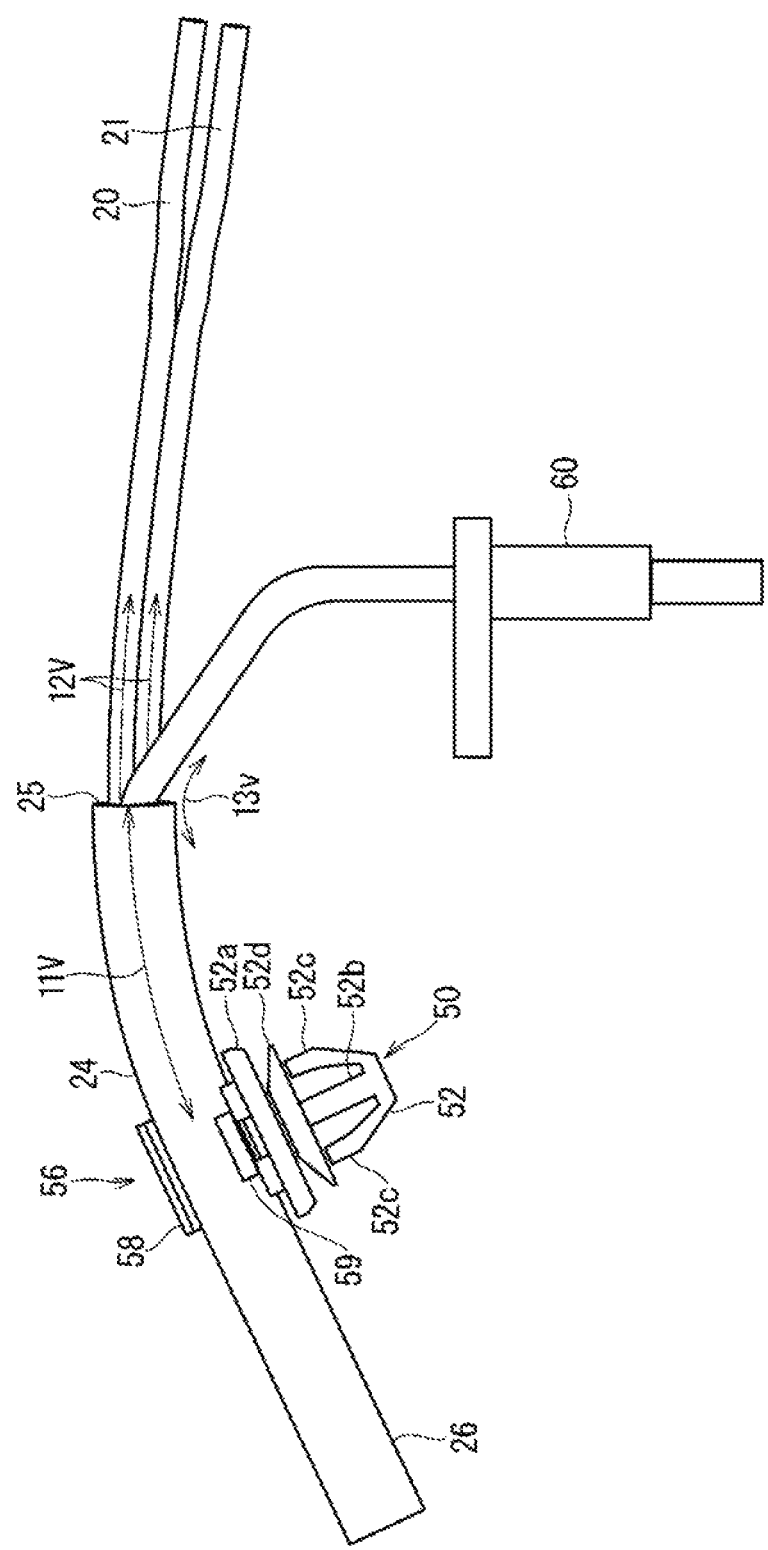
FIG. 5 is a side view showing a state in which a resin molded portion is omitted from the wiring member.

The following describes a wiring member according to Embodiment 1. FIG. 1 is a side view showing a wiring member 10, FIG. 2 is a cross-sectional view taken along line II-II in FIG. 1, FIG. 3 is a cross-sectional view taken along line in FIG. 1, FIG. 4 is a cross-sectional view taken along line Iv-Iv in FIG. 1, and FIG. 5 is a side view showing a state in which a resin molded portion is omitted from the wiring member 10.

The wiring member 10 includes wires 20, 21, 22, and 23 and a resin molded portion 30.

The wiring member 10 may be provided with a single wire, or may be provided with the plurality of wires 20, 21, 22, and 23. Here, an example will be described in which the wiring member 10 includes the plurality of wires 20, 21, 22, and 23.

The wires 20 and 21 include core wires and coatings that cover the peripheries of the core wires. The core wires are conductive wires that are made from copper, a copper alloy, aluminum, an aluminum alloy, or the like. The core wires may be single wires or may be stranded wires. The coatings are insulating coatings that are made from resin or the like, and are formed by a method such as extrusion coating resin around the peripheries of the core wires. The coatings are made from polyethylene, for example. The wires 20 and 21 are power supply lines that transmit power, for example. If the wiring member 10 is installed in a vehicle for example, the wires 20 and 21 may be power supply lines that supply power to an EPB (Electric Parking Brake) or an EMB (Electro-Mechanical Brake system).

The wires 22 and 23 include, similarly to the wires 20 and 21, core wires and coatings (made from polyethylene, for example) that cover the peripheries of the core wires. The wires 22 and 23 are signal lines that transmit signals, for example. If the wiring member 10 is installed in a vehicle for example, the wires 22 and 23 may be signal lines that transmit signals from a sensor 60 for detecting the wheel speed of the vehicle in an ABS (Anti-Lock Brake System). FIGS. 1 and 5 show an example in which the sensor 60 is attached to leading end portions of the wires 22 and 23.

The wiring member 10 may be used as a composite harness that includes a plurality of types of wires. If the wires 20 and 21 are power supply lines and the wires 22 and 23 are signal lines as described above, the wiring member 10 is a composite harness that includes power supply lines (wires 20 and 21) and signal lines (wires 22 and 23). In particular, if the wiring member 10 includes power supply lines (wires 20 and 21) for an electric brake and signal lines (wires 22 and 23) for detecting the vehicle speed, the wiring member 10 is a composite harness for the brake.

The periphery of the plurality of wires 20, 21, 22, and 23 is covered by a sheath 24. The sheath 24 is an insulating coating made from resin or the like, and is formed by a method such as extrusion coating resin around the periphery of the plurality of wires 20, 21, 22, and 23. The sheath 24 is made from polyurethane, for example. The sheath 24 may be omitted.

The sheath 24 covers portions of the plurality of wires 20, 21, 22, and 23 that are toward one end thereof (portions toward the left in FIG. 5). The sheath 24 includes an end portion 25 that is located at an intermediate position of the plurality of wires 20, 21, 22, and 23 in the extending direction thereof and from which the plurality of wires 20, 21, 22, and 23 are exposed. The plurality of wires 20, 21, 22, and 23 are bundled together by the sheath 24 in the portion in which the sheath 24 is provided.

The plurality of wires 20, 21, 22, and 23 extend from the end portion 25 of the sheath 24 and branch therefrom into a plurality of branches. In this example, the plurality of wires 20, 21, 22, and 23 branch into two sets of wires, namely the wires 20 and 21, and the wires 22 and 23.

In the following description, in the above-described portions of the wires 20, 21, 22, and 23 toward one end thereof, a portion in which the wires 20, 21, 22, and 23 are bundled by the sheath 24 may be referred to as a main line portion 26. Also, among portions of the wires 20, 21, 22, and 23 extending from the end portion 25 of the sheath 24, portions of the wires 20 and 21 branching in one direction may be referred to as a first branched portion 27, and portions of the wires 22 and 23 branching in another direction may be referred to as a second branched portion 28.

Note that, in this example, the second branched portion 28 is covered by an outer covering member 29 such as a tube.

The outer covering member 29 may be a resin tube that continuously has the same shape, a corrugated tube that is constituted by alternately arranged small-diameter portions and large-diameter portions, or a piece of adhesive tape that is wrapped in a spiral form. The outer covering member 29 may be omitted. Also, the first branched portion 27 may be covered by an outer covering member.

The wiring member 10 is envisaged to be arranged along a curved path in a vehicle or the like. Therefore, the wires 20, 21, 22, and 23 include a first curved portion 11V, a second curved portion 12V, and a third curved portion 13V (see FIG. 5) to be arranged along the curved path. In this example, the first curved portion 11V is a portion of the above-described main line portion 26 that is continuous to the end portion 25 of the sheath 24. In the first curved portion 11V, the wires 20, 21, 22, and 23 extend while curving without branching. The second curved portion 12V is a portion of the first branched portion 27 that extends from the end portion 25 of the sheath 24. The second curved portion 12V is continuous to the first curved portion 11V and is gently curved relative to the first curved portion 11V. The third curved portion 13V is a portion of the second branched portion 28 that is continuous to the main line portion 26 and is curved outward relative to the main line portion 26 so as to separate from the first branched portion 27. In the case in which the wires 20, 21, 22, and 23 branch midway, some of the wires, namely the wires 22 and 23 extend in the third curved portion 13V while curving relative to the original path of the wires 20, 21, 22, and 23.

The shape into which the wiring member 10 is curved is determined depending on the positional relationship between portions to which end portions of the wiring member 10 are to be attached, the layout of interfering members at a location where the wiring member 10 is to be arranged, etc.

The resin molded portion 30 includes a main body portion 32 and a curve reinforcing portion 38. The resin molded portion 30 is made from polyurethane, for example.

The main body portion 32 covers the curved portions 11V, 12V, and 13V of the wires 20, 21, 22, and 23. The main body portion 32 need not cover entire portions in which the wires 20, 21, 22, and 23 are arranged in a curved state, and is only required to at least partially cover the portions in which the wires 20, 21, 22, and 23 are arranged in a curved state.

In this example, the main body portion 32 covers the end portion 25 of the sheath 24 and base end portions of the plurality of wires 20, 21, 22, and 23 that branch from the end portion 25 of the sheath 24. Namely, the main body portion 32 includes a main line covering portion 33, a first branch covering portion 34, and a second branch covering portion 35. The main line covering portion 33 covers a portion of the main line portion 26 that is toward the end portion 25 of the sheath 24. The first branch covering portion 34 covers a portion of the first branched portion 27 that is toward the end portion 25 of the sheath 24. The second branch covering portion 35 covers a portion of the second branched portion 28 that is toward the end portion 25 of the sheath 24.

The main line covering portion 33 includes a curve covering portion 33a and a straight line covering portion 33b. The curve covering portion 33a extends in a curved state and covers the first curved portion 11V of the main line portion 26 that is close to the end portion 25 of the sheath 24. The straight line covering portion 33b extends straight continuously from the curve covering portion 33a and covers a portion of the main line portion 26 that is far from the end portion 25 of the sheath 24. The curve covering portion 33a keeps the first curved portion 11V of the main line portion 26 in the curved state. The straight line covering portion 33b keeps a portion of the main line portion 26 that is continuous to the first curved portion 11V straight.

The main line covering portion 33 is provided with a fixing member attachment portion 33d. In this example, the fixing member attachment portion 33d is provided at a portion of the main line covering portion 33 that is located at a boundary between the curve covering portion 33a and the straight line covering portion 33b. The fixing member attachment portion 33d will be described later. The main line covering portion 33 has a circular tube shape, except for the portion where the fixing member attachment portion 33d is provided, but such a shape is not essential, and the main line covering portion 33 may have a rectangular tube shape, for example.

The first branch covering portion 34 includes a curve covering portion 34a and a straight line covering portion 34b.

The curve covering portion 34a extends in a curved state continuously from the curve covering portion 33a of the main line covering portion 33 and covers the second curved portion 12V of the first branched portion 27 extending from the end portion 25 of the sheath 24. The curve covering portion 34a has a flattened circular tube shape, but such a shape is not essential, and the curve covering portion 34a may have a circular tube shape or a rectangular tube shape.

The straight line covering portion 34b extends straight continuously from the curve covering portion 34a and covers a portion of the first branched portion 27 that extends away from the end portion 25 of the sheath 24. In this example, the straight line covering portion 34b has a circular tube shape that is smaller than the curve covering portion 34a, but such a configuration is not essential. The straight line covering portion 34b may have the same thickness as the curve covering portion 34a. The straight line covering portion 34b may also have a rectangular tube shape.

The curve covering portion 34a keeps the second curved portion 12V of the first branched portion 27 in the curved state. The straight line covering portion 34b keeps a portion of the first branched portion 27 that is continuous to the second curved portion 12V straight.

The second branch covering portion 35 extends outward from a boundary portion between the main line covering portion 33 and the first branch covering portion 34. More specifically, the second branch covering portion 35 extends so as to gradually separate from the first branch covering portion 34 in a direction from the boundary portion between the main line covering portion 33 and the first branch covering portion 34 toward the first branch covering portion 34. The second branch covering portion 35 covers the third curved portion 13V at the base end portion of the second branched portion 28, extending in the direction in which the second branched portion 28 curves relative to the main line portion 26. Inside the second branch covering portion 35, the second branched portion 28 is kept straight or curved (slightly curved), except for its base end portion. The second branch covering portion 35 has a circular tube shape or a flattened circular tube shape, but such a shape is not essential, and the second branch covering portion 35 may have a rectangular tube shape.

A base end portion of the second branch covering portion 35 is formed so as to be wide in the extending direction of the wires 20 and 21 at a portion that is connected to the outer peripheral surfaces of the main line covering portion 33 and the first branch covering portion 34. This configuration stabilizes the extending direction of the second branch covering portion 35 relative to the main line covering portion 33 and the first branch covering portion 34.

The curve reinforcing portion 38 protrudes from the outer peripheral surface of the main body portion 32 and extends along the extending direction of the first curved portion 11V and the third curved portion 13V. The curve reinforcing portion 38 more reliably keeps a portion of the main body portion 32 covering the first curved portion 11V and the third curved portion 13V in the curved state, and also more reliably keeps the first curved portion 11V and the third curved portion 13V inside the main body portion 32 in the curved state. Namely, the curve reinforcing portion 38 reinforces the main body portion 32 to keep at least a portion of the main body portion 32 and at least a portion of the wires 20, 21, 22, and 23 inside the main body portion 32 in the curved state. When the main body portion 32 is observed along the circumferential direction thereof, the curve reinforcing portion 38 protrudes from a portion of the outer peripheral surface of the main body portion 32. Accordingly, the main body portion 32 is thin, when compared to a case in which the entire main body portion 32 is made thick to keep the main body portion 32 in a predetermined curved state. This contributes to a reduction in the weight of the resin molded portion 30 and a reduction in the amount of material used, for example.

The curve reinforcing portion 38 may be provided on the inner circumferential side of the curved shape of the main body portion 32 to more reliably keep the main body portion 32 in the curved state. The present embodiment shows an example in which the curve reinforcing portion 38 is provided on the inner circumferential side of the curved shape of the main body portion 32. Here, the inner circumferential side of the curved shape of the main body portion 32 is the side on which the shape of the main body portion 32 that is curved or bent forming an angle is recessed. For example, if the main body portion 32 includes an arcuate portion having a curved shape, the inner circumferential side of the curved shape of the main body portion 32 is the side of the arcuate portion where the center of curvature exits.

In this example, on the inner circumferential side of a curved shape of a portion that spans from the main line covering portion 33 to the second branch covering portion 35, the curve reinforcing portion 38 is provided spanning from a portion of the curve covering portion 33a of the main line covering portion 33 that is toward the straight line covering portion 33b to a portion of the second branch covering portion 35 that is toward an outer end portion thereof. An edge portion of the curve reinforcing portion 38 that is continuous to the outer peripheral surfaces of the main line covering portion 33 and the second branch covering portion 35 has an arc shape and an outer edge portion on the opposite side of the curve reinforcing portion 38 is straight. Accordingly, the curve reinforcing portion 38 has a plate shape that is surrounded by a partial arc and a chord. In this example, the edge portion of the curve reinforcing portion 38 on the outer side of the main line covering portion 33 is curved inward, but such a shape is not essential.

When the curve reinforcing portion 38 is viewed in relation to the first curved portion 11V, the curve reinforcing portion 38 is provided in a region that extends from one end portion of the first curved portion 11V past the other end portion of the first curved portion 11V. When the curve reinforcing portion 38 is viewed in relation to the third curved portion 13V, the curve reinforcing portion 38 is provided in a region that extends past both end portions of the third curved portion 13V.

Therefore, if a force that acts to restore the main line portion 26 to the straight state acts on the main body portion 32, the force acts as a force that pulls on the curve reinforcing portion 38 in the direction of arrow A. Here, assuming a case in which a compressive force is applied to an elongated portion in its extending direction and a case in which a tensile force is applied to the elongated portion in its extending direction, it is thought that the elongated portion is less likely to deform in the latter case. Therefore, even if a tensile force acts on the curve reinforcing portion 38, the curve reinforcing portion 38 is unlikely to deform and the main line covering portion 33 and the first curved portion 11V inside the main line covering portion 33 are kept in the curved state.

Similarly, if a force that acts to restore the second branched portion 28 extending from the main line portion 26 to the straight state acts on the main body portion 32, the force acts as a force that pulls on the curve reinforcing portion 38 in the direction of arrow B. Similarly to the above, even if a tensile force acts on the curve reinforcing portion 38, the curve reinforcing portion 38 is unlikely to deform and the curved shape of the portion spanning from the main line covering portion 33 to the second branch covering portion 35 and the third curved portion 13V inside this portion are kept in the curved state.

It is not essential to provide the curve reinforcing portion 38 on the inner circumferential side of the curved shape of the main body portion 32. The curve reinforcing portion may be provided on the outer circumferential side of the curved shape of the main body portion or another portion. It is not essential that the curve reinforcing portion 38 has a plate shape. The curve reinforcing portion may have an elongated rectangular column shape or an elongated semicircular column shape, for example.

The above-described resin molded portion 30 is made from resin such as a polyurethane resin, for example. The polyurethane resin has high impact resistance etc. and is suitable for protecting the wires 20, 21, 22, and 23, for example, but easily deforms. Therefore, if the wires 20, 21, 22, and 23 inside the resin molded portion 30 attempt to return to their original shapes, it may be difficult to maintain the intended curved shape. Use of the above-described curve reinforcing portion 38 is more effective in such a case.

The above-described resin molded portion 30 can be formed as a single body through insert molding by using an injection mold and, as insert target portions, a portion of the main line portion 26 toward the end portion 25 of the sheath 24, the base end portion of the first branched portion 27, and the base end portion of the second branched portion 28, for example. In other words, the resin molded portion 30 is a molded component. The resin molded portion 30 seals an opening of the end portion 25 of the sheath 24 in a state in which the resin molded portion 30 is in liquid-tight contact with the outer peripheral surface of the sheath 24, the outer peripheral surface of the first branched portion 27 extending from the end portion 25 of the sheath 24 (in this example, the outer peripheral surfaces of the wires 20 and 21), and the outer peripheral surface of the second branched portion 28 (in this example, the outer peripheral surface of the outer covering member 29).

Also, the resin molded portion 30 is provided with a fixing member 50 that is to be fixed to a fixing target. The fixing target is a vehicle, for example. That is, the resin molded portion 30 is provided with the fixing member attachment portion 33d as described above. The fixing member attachment portion 33d is provided at the portion of the main line covering portion 33 located at the boundary between the curve covering portion 33a and the straight line covering portion 33b. The fixing member attachment portion 33d is thicker than other portions of the main line covering portion 33, and the fixing member 50 is attached to the fixing member attachment portion 33d with a portion of the fixing member 50 being embedded in the fixing member attachment portion 33d. In this example, the fixing member attachment portion 33d has a short circular column shape. The axial direction of the fixing member attachment portion 33d is orthogonal to the extending direction of the main line covering portion 33 and extends in a direction that connects the inner circumferential side and the outer circumferential side of the first curved portion 11V. The diameter of the fixing member attachment portion 33d and its length in the axial direction are larger than the diameter of the main line covering portion 33, and the fixing member attachment portion 33d protrudes from the main line covering portion 33.

The fixing member 50 includes a first fixing portion 52 and a second fixing portion 56. The first fixing portion 52 is a portion configured to be fixed to a fixing target such as a vehicle. The second fixing portion 56 is a portion configured to be fixed to the resin molded portion 30, and is embedded in the resin molded portion 30 in this example. In this example, the fixing member 50 is made from resin or the like as a single body.

The first fixing portion 52 includes a base portion 52a, a columnar portion 52b, a pair of lock claws 52c, and a disk-shaped portion 52d.

The base portion 52a has a plate shape, which is a circular plate shape in this example. The columnar portion 52b is formed protruding from a main surface (a surface that faces outward in a state in which the base portion 52a is attached to the resin molded portion 30) of the base portion 52a. The pair of lock claws 52c extend inclining outward from a leading end of the columnar portion 52b toward a base end side thereof. The disk-shaped portion 52d is provided at the base end portion of the columnar portion 52b and has the shape of a disk spring that gradually widens toward the leading end side of the columnar portion 52b. When the first fixing portion 52 is inserted into an attachment hole formed in an attachment panel, which is one example of the attachment target, the pair of lock claws 52c lock to a peripheral edge portion of the attachment hole from a direction that is opposite to the insertion direction, and the disk-shaped portion 52d abuts against the peripheral edge portion of the attachment hole from the insertion direction. Thus, the first fixing portion 52 is fixed to the attachment panel. Namely, the first fixing portion 52 is a well-known fixing structure called a clip or a clamp, for example.

The first fixing portion 52 does not necessarily have to be configured as described above, and various configurations that can be fixed to the attachment target can be employed. For example, the first fixing portion may include a bolt hole and be configured to be fixed to the attachment target by fastening a bolt, for example.

The second fixing portion 56 is fixed to the resin molded portion 30 as a result of being embedded in the resin molded portion 30. The second fixing portion 56 is inserted as an insert target portion into the resin molded portion 30 when the resin molded portion 30 is molded, and thus the second fixing portion 56 is embedded in the resin molded portion 30.

In this example, the second fixing portion 56 includes a plurality of restriction surfaces 57f, 58f, and 59f that restrict the position of the wires 20, 21, 22, and 23 from a plurality of directions in a state before the resin molded portion 30 is formed.

More specifically, the second fixing portion 56 includes a side plate portion 57, a retaining portion 58, and a side retaining portion 59. The side plate portion 57, the retaining portion 58, and the side retaining portion 59 are embedded in the fixing member attachment portion 33d of the resin molded portion 30 in a state in which the base portion 52a is in close contact with one end surface of the fixing member attachment portion 33d.

The side plate portion 57 has a plate shape and protrudes from another main surface (a surface that faces inward in a state in which the base portion 52a is attached to the resin molded portion 30) of the base portion 52a, at a position that is spaced from the center of the base portion 52a. The protruding length of the side plate portion 57 is set to be equal to or larger (slightly larger) than the outer diameter of the sheath 24. A surface of the side plate portion 57 that faces inward is the restriction surface 57f. Note that a protrusion 57a is also formed on a surface of the side plate portion 57 that faces outward, and the protrusion 57a makes the side plate portion 57 unlikely to come out from the resin molded portion 30.

The retaining portion 58 protrudes inward from a leading end portion of the side plate portion 57. The retaining portion 58 is spaced from the base portion 52a by a distance that corresponds to the protruding length of the side plate portion 57. Accordingly, the sheath 24 covering the wires 20, 21, 22, and 23 is arranged between the base portion 52a and the retaining portion 58.

The protruding length of the retaining portion 58 is smaller than the outer diameter of the sheath 24, and is about half the outer diameter of the sheath 24 in this example. A surface of the retaining portion 58 that faces inward is the restriction surface 58f.

The side retaining portion 59 protrudes from the other main surface (surface facing inward) of the base portion 52a, at a position that is spaced from the center of the base portion 52a on the side opposite to the side plate portion 57. The distance between the side plate portion 57 and the side retaining portion 59 is set to be equal to or larger (slightly larger) than the outer diameter of the sheath 24. Therefore, the sheath 24 covering the wires 20, 21, 22, and 23 can be arranged between the side plate portion 57 and the side retaining portion 59. A surface of the side retaining portion 59 that faces inward is the restriction surface 59f.

The protruding length of the side retaining portion 59 is set to be smaller than the outer diameter of the sheath 24. A gap through which the sheath 24 covering the wires 20, 21, 22, and 23 can pass is formed between a leading end portion of the retaining portion 58 and a leading end portion of the side retaining portion 59. The distance between the leading end portion of the retaining portion 58 and the leading end portion of the side retaining portion 59 may be set to be smaller than the diameter of the sheath 24. In this case, the side plate portion 57, the retaining portion 58, the side retaining portion 59, etc. can be elastically deformed to widen the gap between the leading end portion of the retaining portion 58 and the leading end portion of the side retaining portion 59. As a result, the sheath 24 covering the wires 20, 21, 22, and 23 can pass through the gap and be arranged in a space surrounded by the base portion 52a, the side plate portion 57, the retaining portion 58, and the side retaining portion 59. In this case, the sheath 24 is unlikely to come out from the second fixing portion 56. Note that a portion of the leading end portion of the retaining portion 58 that faces inward is chamfered and a portion of the leading end portion of the side retaining portion 59 that faces inward is chamfered.

This increases areas of the respective leading end portions of the retaining portion 58 and the side retaining portion 59 that come into contact with the sheath 24 when the sheath 24 passes between the leading end portion of the retaining portion 58 and the leading end portion of the side retaining portion 59, and therefore the sheath 24 can smoothly pass between the leading end portions.

Note that a protrusion 59a that protrudes outward is formed in the leading end portion of the side retaining portion 59. In a state in which the side retaining portion 59 is embedded in the resin molded portion 30, the protrusion 59a can serve to prevent the side retaining portion 59 from coming out from the resin molded portion 30.

In a state in which the sheath 24 covering the wires 20, 21, 22, and 23 is arranged in the space surrounded by the base portion 52a, the side plate portion 57, the retaining portion 58, and the side retaining portion 59 as described above, the restriction surfaces 57f, 58f, and 59f abut against the outer peripheral surface of the sheath 24 from three directions. Thus, the restriction surfaces 57f, 58f, and 59f restrict the position of the wires 20, 21, 22, and 23 from the three directions.

When the second fixing portion 56 is inserted as an insert target portion into the resin molded portion 30 in insert molding of the resin molded portion 30 as described above, the main line portion 26 is held in the space surrounded by the base portion 52a, the side plate portion 57, the retaining portion 58, and the side retaining portion 59. In this state, the main line portion 26 is positioned by the restriction surfaces 57f, 58f, and 59f from a plurality of directions. The fixing member 50 including the second fixing portion 56, which is the insert target portion, is supported at a predetermined position by the mold used for injection molding via the first fixing portion 52 etc. Therefore, inside the mold used for injection molding, the main line portion 26 is also held at a predetermined position to some extent by the second fixing portion 56, and unlikely to be exposed from the resin molded portion 30.

The fixing member 50 does not necessarily have to be made from resin, and may be made from metal or the like.

According to the wiring member 10 configured as described above, the main body portion 32 and the first curved portion 11V and the third curved portion 13V covered by the main body portion 32 are more reliably kept in the curved state by the curve reinforcing portion 38. Therefore, the wiring member 10 is more reliably kept extending along a curved path.

In particular, a force that acts to restore the wires 20, 21, 22, and 23 to the straight state also acts to restore the main body portion 32 to the straight state. In a case in which there are many wires 20, 21, 22, and 23, the wires 20, 21, 22, and 23 are thick, or the wires 20, 21, 22, and 23 are covered by the sheath 24, the force that acts to restore the wires 20, 21, 22, and 23 to the straight state is large. The above-described curve reinforcing portion 38 can take on the force that acts to restore the main body portion 32 to the straight state, and therefore the wiring member 10 is more reliably kept extending along the curved path.

Furthermore, as a result of the wiring member 10 being kept extending along the curved path by the resin molded portion 30, fixed positions of the wiring member 10 can be reduced. Namely, as a configuration for keeping wires in a curved state, a configuration can be considered in which the wires are fixed at a plurality of positions and kept in the curved state between the fixed positions. In this case, the number of fixing members and fixing operations increase, and this leads to an increase in cost. In the wiring member 10, the resin molded portion 30 itself keeps the wires 20, 21, 22, and 23 in the curved state, and accordingly fixed positions can be reduced and this contributes to a reduction in cost.

Furthermore, the curve reinforcing portion 38 is provided on the inner side of the curved shape of the main body portion 32, and accordingly the force that acts to restore the wires 20, 21, 22, and 23 to the straight state acts on the curve reinforcing portion 38 as a tensile force along the longitudinal direction of the curve reinforcing portion 38. It is thought that the curve reinforcing portion 38 is less likely to deform in a case in which the curve reinforcing portion 38 is pulled on than in a case in which the curve reinforcing portion 38 is compressed, and therefore the main body portion 32, the first curved portion 11V, and the third curved portion 13V are more reliably kept in the curved state.

Furthermore, the plurality of wires 20, 21, 22, and 23 branch from the end portion of the sheath 24 covering the wires 20, 21, 22, and 23 into the first branched portion 27 and the second branched portion 28. The resin molded portion 30 covers the end portion 25 of the sheath 24 and the base end portions of the first branched portion 27 and the second branched portion 28. With this configuration, the portion at which the plurality of wires 20, 21, 22, and 23 branch can be made waterproof by the resin molded portion 30. Also, the wires 20, 21, 22, and 23 are kept in the curved state in the vicinity of the portion.

Furthermore, as a result of the base end portions of the first branched portion 27 and the second branched portion 28 being covered by the resin molded portion 30, the extending directions of the first branched portion 27 and the second branched portion 28 are regulated, and interference between the first branched portion 27 and the second branched portion 28 is suppressed.

The main line portion 26 in which the plurality of wires 20, 21, 22, and 23 are covered by the sheath 24 is likely to be thick and a force that restores the main line portion 26 to the straight state is likely to be large. Accordingly, in order to keep the first curved portion 11V of the main line portion 26 in the curved state, it is effective to provide the curve reinforcing portion 38 in the curve covering portion 33a of the main line covering portion 33 that covers the first curved portion 11V.

The resin molded portion 30 is provided with the fixing member 50 to be fixed to a fixing target. Therefore, when the fixing member 50 is fixed to the fixing target, the wires 20, 21, 22, and 23 are kept in the curved state with respect to the fixed position, and more reliably kept extending along the curved path. As a result, even if another fixed position is not set near the fixed position, the wires 20, 21, 22, and 23 can be kept extending along the curved path, and fixed positions of the wires 20, 21, 22, and 23 can be reduced.

Furthermore, the second fixing portion 56 of the fixing member 50 is embedded in the resin molded portion 30. Therefore, the fixing member 50 is firmly fixed to the resin molded portion 30. In particular, when compared to a case in which the fixing member is fixed using a binding belt or the like, the second fixing portion 56 of the fixing member 50 is firmly positioned relative to the resin molded portion 30 and unlikely to be displaced. Therefore, the wiring member 10 can be fixed to an attachment target with high accuracy. Furthermore, the fixing member 50 is fixed when the resin molded portion 30 is formed, and therefore there is no need to perform a separate operation for attaching the fixing member after forming the resin molded portion, and the manufacturing process is simplified.

The second fixing portion 56 includes the restriction surfaces 57f, 58f, and 59f that restrict the position of the wires 20, 21, 22, and 23 from a plurality of directions. With this configuration, the resin molded portion 30 is formed in a state in which the position of the wires 20, 21, 22, and 23 is restricted by the restriction surfaces 57f, 58f, and 59f, and therefore the wires 20, 21, 22, and 23 are unlikely to be exposed from the resin molded portion 30 to the outside.

Embodiment 2

Figure 6:
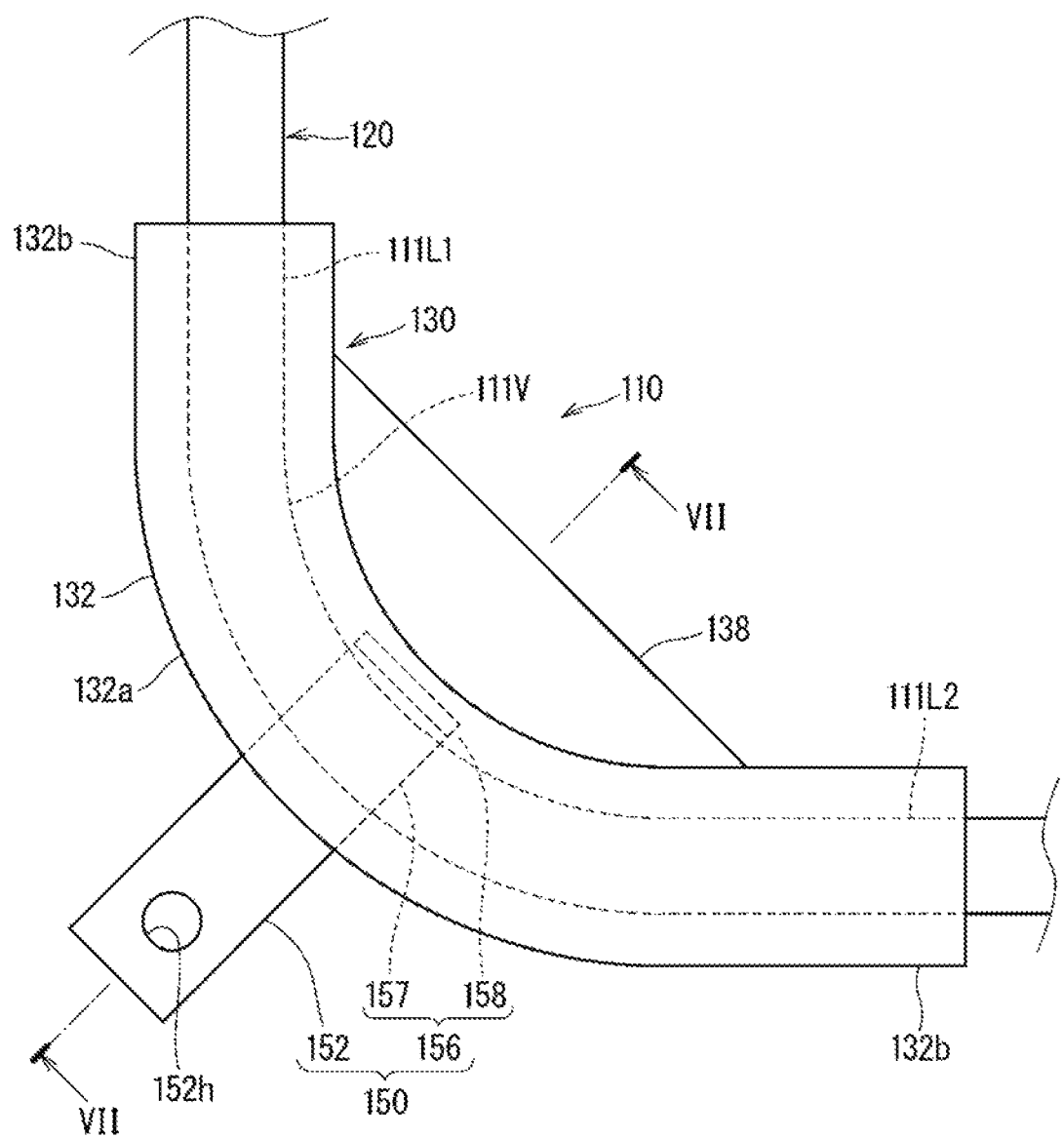
FIG. 6 is a side view showing a wiring member according to Embodiment 2.
Figure 7:
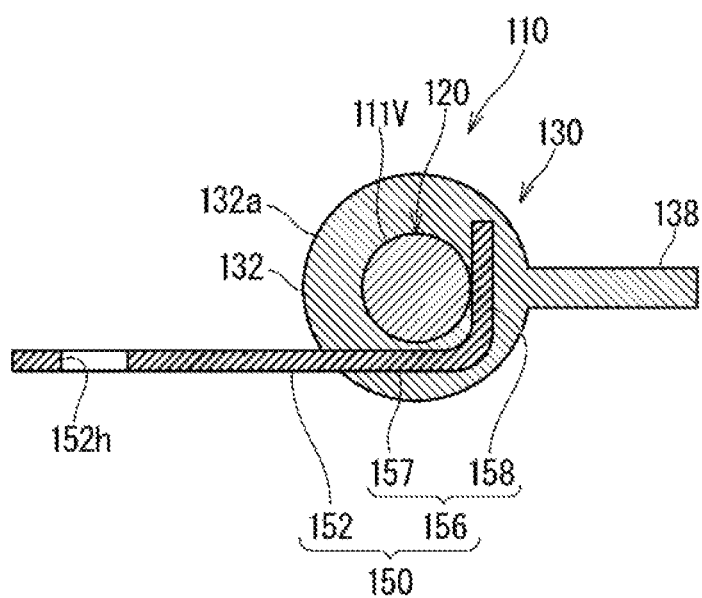
FIG. 7 is a cross-sectional view taken along line VII-VII in FIG. 6.

The following describes a wiring member according to Embodiment 2. FIG. 6 is a side view showing a wiring member 110 according to Embodiment 2. FIG. 7 is a cross-sectional view taken along line VII-VII in FIG. 6. In FIG. 7, the internal structure of a wire is omitted. Embodiment 2 will be described focusing on differences from the above-described Embodiment 1.

The wiring member 110 includes a wire 120 and a resin molded portion 130.

Similarly to the wire 20 in the above-described Embodiment 1, the wire 120 includes a core wire and a coating that covers the periphery of the core wire. In the present embodiment, the single wire 120 is illustrated. However, similarly to Embodiment 1, the wiring member may be provided with a single wire or may be provided with a plurality of wires. The wiring member may also include a composite harness.

Similarly to Embodiment 1, the wiring member 110 is envisaged to be arranged along a curved path in a vehicle or the like. Therefore, the wire 120 includes a curved portion 111V (see FIG. 6) to be arranged along the curved path. In this example, the curved portion 111V is a portion of an intermediate portion of the wire 120 in the extending direction of the wire 120. The wire 120 is curved at the curved portion 111V so as to have a partial arc shape. Straight portions 111L1 and 111L2 are respectively continuous from opposite sides of the curved portion 111V. The wire 120 extends straight in the straight portions 111L1 and 111L2. The wire may have a composite curve shape at the curved portion. The shape into which the wiring member and the wire are curved is determined depending on the positional relationship between portions to which end portions of the wiring member are to be attached, the layout of interfering members at a location where the wiring member 110 is to be arranged, etc.

The resin molded portion 130 includes a main body portion 132 and a curve reinforcing portion 138. The resin molded portion 130 is made from polyurethane, for example.

Similarly to the above-described main body portion 32, the main body portion 132 covers the curved portion 111V of the wire 120. In this example, the main body portion 132 includes a curve covering portion 132a and straight line covering portions 132b and 132c. The curve covering portion 132a covers only a curved portion of the wire 120, which is the above-described curved portion 111V in this example. The straight line covering portions 132b and 132c cover only straight portions of the wire 120, which are portions of the straight portions 111L1 and 111L2 on the opposite sides of the above-described curved portion 111V in this example. The curve covering portion 132a extends in a curved state conforming to the curved path and covers the curved portion 111V. Thus, the curved portion 111V is kept in the curved state owing to the rigidity of the curve covering portion 132a. The straight line covering portions 132b and 132c extend straight and partially cover the straight portions 111L1 and 111L2. Thus, the straight portions 111L1 and 111L2 are kept straight on the opposite sides of the curved portion 111V owing to the rigidity of the straight line covering portions 132b and 132c. Note that it is not essential that the resin molded portion 130 covers the straight portions 111L1 and 111L2.

Similarly to the above-described curve reinforcing portion 38, the curve reinforcing portion 138 protrudes from the outer peripheral surface of the main body portion 132 and extends along the extending direction of the above-described curved portion 111V. The curve reinforcing portion 138 more reliably keeps the curve covering portion 132a of the main body portion 132 covering the curved portion 111V in the curved state. Similarly to Embodiment 1, the curve reinforcing portion 138 protrudes from a portion of the outer peripheral surface of the main body portion 132. The thickness of the curve reinforcing portion 138 is smaller than the diameter of the main body portion 132. Therefore, the wire 120 can be kept in the curved state by the curve reinforcing portion 138 while making the main body portion 132 as thin as possible, and this contributes to a reduction in the weight of the resin molded portion 130 and a reduction in the amount of material used, for example.

Similarly to Embodiment 1, the curve reinforcing portion 138 may be provided on the inner circumferential side of the curved shape of the main body portion 132 to more reliably keep the main body portion 132 in the curved state.

In this example, the curve reinforcing portion 138 is formed in a region that extends past both ends of the curve covering portion 132a and reaches the straight line covering portions 132b and 132c. A configuration is also possible in which the curve reinforcing portion 138 is formed only in a region between both ends of the curve covering portion or a region that is a portion of an intermediate portion of the curve covering portion 132a in its extending direction. For example, a configuration is also possible in which the curve reinforcing portion 138 is provided only in a region of the curved portion 111V that has a small radius of curvature.

Similarly to the above-described Embodiment 1, the curve reinforcing portion 138 keeps the curve covering portion 132a and the curved portion 111V inside the curve covering portion 132a in the curved state.

The resin molded portion 130 is provided with a fixing member 150 that is to be fixed to a fixing target. The fixing target is a vehicle, for example. In the present embodiment, the fixing member 150 is provided at the curve covering portion 132a. Therefore, the fixing member 150 can fix at least a portion of the curved portion 111V of the wire 120, which is arranged along the curved path, to a predetermined position. The portion of the resin molded portion 130 to which the fixing member 150 is attached may be made thicker than other portions of the resin molded portion 130.

The fixing member 150 includes a first fixing portion 152 and a second fixing portion 156. The first fixing portion 152 is a portion configured to be fixed to a fixing target such as a vehicle. The second fixing portion 156 is a portion configured to be fixed to the resin molded portion 130, and is embedded in the resin molded portion 130 in this example. In this example, the fixing member 150 is made from a metal plate or the like. The first fixing portion 152 and the second fixing portion 156 are formed continuously to each other as a single body by pressing a metal plate, for example. The fixing member may be made from resin or the like as a single body. Providing the fixing member 150 in the curve covering portion 132a includes a case in which the second fixing portion 156 is embedded only in the curve covering portion 132a, and may also include a case in which the second fixing portion 156 is embedded spanning both the curve covering portion 132a and the straight line covering portion 132b (or 132c).

The first fixing portion 152 has a plate shape. A base end portion of the first fixing portion 152 is continuous to one end portion of the second fixing portion 156. The first fixing portion 152 extends outward from the resin molded portion 130 and is fixed to the attachment target. In this example, a screw hole 152h is formed in the first fixing portion 152. The first fixing portion 152 is fixed to the attachment target using a screw. Alternatively, the first fixing portion may be fixed to the attachment target through welding or by using an insertion structure or the like.

The second fixing portion 156 is fixed to the resin molded portion 130 as a result of being embedded in the resin molded portion 130. The second fixing portion 156 is inserted as an insert target portion into the resin molded portion 130 when the resin molded portion 130 is molded, and thus the second fixing portion 156 is embedded in the resin molded portion 130.

In this example, the second fixing portion 156 includes a second fixing portion main body 157 and a stopper portion 158. The second fixing portion main body 157 is embedded in the resin molded portion 130 so as to extend in a direction that intersects the extending direction of the wire 120. In this example, the second fixing portion main body 157 has a plate shape. The second fixing portion main body 157 is continuous to the first fixing portion 152 and is straight relative to the first fixing portion 152. The second fixing portion main body may also have a round rod shape or a rectangular rod shape. The second fixing portion main body 157 may also be curved relative to the first fixing portion. The second fixing portion main body 157 may be in contact with the wire 120 or may be spaced from the wire 120 inside the resin molded portion 130. In this example, the second fixing portion main body 157 is spaced from the wire 120. For example, when the resin molded portion 130 is molded, a pin may be arranged in a hole that is formed in the second fixing portion main body 157, and the wire 120 may be supported by the pin to be spaced from the second fixing portion main body 157.

The stopper portion 158 protrudes from the other end portion (the end portion opposite to the end portion continuous to the first fixing portion 152) of the second fixing portion main body 157 in a direction that intersects the extending direction of the second fixing portion main body 157 and the extending direction of the wire 120. Inside the resin molded portion 130, the stopper portion 158 faces the wire 120. Namely, the stopper portion 158 protrudes from the other end portion of the second fixing portion main body 157 toward the side on which the wire 120 is arranged.

Resin is interposed in at least a portion between the stopper portion 158 and the wire 120. In this example, the stopper portion 158 is arranged on the inner side of the curved portion 111V of the wire 120. On the inner side of the stopper portion 158, the wire 120 is arcuately curved. Accordingly, there is a space between the stopper portion 158 and the wire 120, the space being the largest at a widthwise central portion of the stopper portion 158 and being the smallest at both side portions of the stopper portion 158, and this space is filled with a portion of the resin forming the resin molded portion 130. A configuration is also possible in which a portion of the stopper portion 158 that faces the wire 120 is in contact with the wire 120, and the resin is interposed between the wire 120 and the remaining portion of the stopper portion 158 that faces the wire 120. As a result of the resin being interposed between the stopper portion 158 and the wire 120, the wire 120 can extend along a desired path without being affected by the shape of the stopper portion 158. Note that a portion of the stopper portion 158 may be in contact with the wire 120.

Note that surfaces of the above-described second fixing portion main body 157 and the stopper portion 158 that face the wire 120 are one example of a plurality of restriction surfaces that restrict the position of the wire 120 from a plurality of directions in a state before the resin molded portion 130 is formed.

The wiring member 110 (composite harness) configured as described above can have functions and effects that are similar to those described above in Embodiment 1.

In particular, the main body portion 132 includes the curve covering portion 132a that covers the curved portion 111V, and the fixing member 150 is provided in the curve covering portion 132a. Therefore, the curved portion 111V of the wire 120 can be fixed to the fixing target using the fixing member 150. This improves freedom of the layout of the wiring member 110.

Furthermore, in the present embodiment, the second fixing portion 156 is embedded in the resin molded portion 130 so as to extend in the direction that intersects the extending direction of the wire 120. Also, the stopper portion 158 protrudes from the other end portion of the second fixing portion main body 157 and faces the wire 120 inside the resin molded portion 130. With this configuration, the fixing member 150 is positioned in a direction that is orthogonal to the second fixing portion main body 157, mainly by the second fixing portion main body 157. Also, the fixing member 150 is positioned in a direction that is orthogonal to the stopper portion 158, mainly by the stopper portion 158. Here, if the fixing member is fixed to the wire through caulking, a portion of the wire to which the fixing member is caulked is to be formed straight in view of processability etc. In the present embodiment, the second fixing portion 156 is embedded in the resin molded portion 130 without sandwiching the wire 120. In this case, the stopper portion 158 can perform positioning even if resin is interposed in at least a portion between the stopper portion 158 and the wire 120. Therefore, in a case in which the fixing member 150 is provided in the curve covering portion 132a, the wire 120 can be kept from being restricted by the shape of the second fixing portion 156.

Variation

In the above-described embodiments, the fixing members 50 and 150 may be omitted. In this case as well, the wires are kept extending along a curved path by the resin molded portion between fixed positions of the wiring member, for example.

In the above-described Embodiment 1, the wires 20, 21, 22, and 23 branch midway, but a configuration is also possible in which wires that do not branch are covered by the resin molded portion in a curved state.

In the above-described Embodiment 2, a plurality of wires may branch midway, similarly to Embodiment 1. In this case, a configuration is also possible in which the plurality of wires are covered by a sheath, extend from an end portion of the sheath and branch therefrom into a plurality of branches, and a resin molded portion covers the end portion of the sheath and base end portions of the plurality of wires branching from the end portion of the sheath.

In each of the above-described embodiments and variations, all of the plurality of wires may be power supply lines or signal lines. If the plurality of wires are a combination of power supply lines and signal lines, there is no limitation on which of the wires are power supply lines and which of the wires are signal lines.

In the above-described embodiments, examples are described in which the second fixing portions 56 and 156 are embedded in the resin molded portions 30 and 130, but such a configuration does not necessarily have to be employed. A configuration is also possible in which a binding band or the like that serves as the second fixing portion is formed to constitute a single body together with the fixing member, and the fixing member is fixed to the resin molded portion 30 or 130 by winding the binding band around the resin molded portion 30 or 130. Alternatively, a configuration is also possible in which the second fixing portion is made from metal or the like, and fixed to the resin molded portion 30 or 130 through caulking.

Note that the configurations described above in Embodiments and variations can be appropriately combined so long as no contradiction is incurred.

What is claimed is:

1. A wiring member comprising:
a plurality of wires that includes a curved portion to be arranged along a curved path;
a sheath that covers the plurality of wires;
wherein the plurality of wires extend from an end portion of the sheath and branch therefrom into a plurality of branches; and
a resin molded portion that covers the end portion of the sheath and a base end portions of the plurality of wires branching from the end portion of the sheath, the resin mold portion includes a main body portion and a curve reinforcing portion, the main body portion covers the curved portion of the plurality of wires, and the curve reinforcing portion protrudes from an outer peripheral surface of the main body portion and extends along an extending direction of the curved portion.

2. The wiring member according to claim 1, wherein the curve reinforcing portion is provided on an inner circumferential side of a curved shape of the main body portion.

3. The wiring member according to claim 1, wherein the resin molded portion is provided with a fixing member configured to be fixed to a fixing target.

4. The wiring member according to claim 3, wherein the main body portion includes a curve covering portion that extends in a curved state and covers the curved portion, and the curve covering portion is provided with the fixing member.

5. The wiring member according to claim 4, wherein the fixing member includes a first fixing portion configured to be fixed to a fixing target and a second fixing portion configured to be fixed to the resin molded portion, and
the second fixing portion is embedded in the resin molded portion.

6. The wiring member according to claim 3, wherein the fixing member includes a first fixing portion configured to be fixed to a fixing target and a second fixing portion configured to be fixed to the resin molded portion, and
the second fixing portion is embedded in the resin molded portion.

7. The wiring member according to claim 6, wherein the second fixing portion includes:
a second fixing portion main body that is embedded in the resin molded portion so as to extend in a direction intersecting an extending direction of the wire and includes one end portion that is continuous to the first fixing portion that extends outward from the resin molded portion; and
a stopper portion that protrudes from another end portion of the second fixing portion main body in a direction intersecting an extending direction of the second fixing portion main body and the extending direction of the wire and faces the wire inside the resin molded portion, and
resin is interposed in at least a portion between the stopper portion and the wire.

8. The wiring member according to claim 7, wherein the second fixing portion includes a plurality of restriction surfaces that restrict a position of the wire from a plurality of directions in a state before the resin molded portion is formed.

9. The wiring member according to claim 6, wherein the second fixing portion includes a plurality of restriction surfaces that restrict a position of the wire from a plurality of directions in a state before the resin molded portion is formed.

10. The composite harness according to claim 3, wherein the fixing member includes a first fixing portion configured to be fixed to a fixing target and a second fixing portion configured to be fixed to the resin molded portion, and
the second fixing portion is embedded in the resin molded portion.

11. A composite harness comprising:
a plurality of wires that includes a curved portion to be arranged along a curved path, the plurality of wires being a plurality of types of wires;
a sheath that covers the plurality of wires;
wherein the plurality of wires extend from an end portion of the sheath and branch therefrom into a plurality of branches; and
a resin molded portion that covers the end portion of the sheath and a base end portions of the plurality of wires branching from the end portion of the sheath, the resin mold portion includes a main body portion and a curve reinforcing portion, the main body portion covers the curved portion of the plurality of wires, and the curve reinforcing portion protrudes from an outer peripheral surface of the main body portion and extends along an extending direction of the curved portion.

12. The composite harness according to claim 11, wherein the curve reinforcing portion is provided on an inner circumferential side of a curved shape of the main body portion.

13. The composite harness according to claim 11, wherein the resin molded portion is provided with a fixing member configured to be fixed to a fixing target.

14. The composite harness according to claim 13, wherein the main body portion includes a curve covering portion that extends in a curved state and covers the curved portion, and
the curve covering portion is provided with the fixing member.

* * * * *